United States Patent [19]
Redford

[11] Patent Number: 5,925,563
[45] Date of Patent: Jul. 20, 1999

[54] MULTI-STAGE COLUMN CONTINUOUS FERMENTATION SYSTEM

[76] Inventor: Steven G. Redford, 801 S 6th St., Hudson, Wis. 54016

[21] Appl. No.: 08/897,223

[22] Filed: Jul. 21, 1997

[51] Int. Cl.⁶ .................................................. C12M 3/00
[52] U.S. Cl. ........................ 435/300.1; 435/813; 99/276
[58] Field of Search ............................. 435/291.1, 300.1, 435/813; 99/276

[56] References Cited

U.S. PATENT DOCUMENTS

| | | |
|---|---|---|
| 2,967,107 | 1/1961 | Geiger et al. . |
| 3,201,328 | 8/1965 | Williams . |
| 4,256,837 | 3/1981 | Fluri et al. ............................. 435/167 |
| 4,298,693 | 11/1981 | Wallace ................................... 435/305 |

*Primary Examiner*—David A. Redding
*Attorney, Agent, or Firm*—Skinner and Associates

[57] ABSTRACT

A multi-stage column continuous fermentation system for brewing beer and the like. The system comprises several basic interconnected stages or sections including a discharge stage or section, a feed stage, at least one fermentation stage, a top stage, and a $CO_2$ discharge column. The discharge section functions in waste and yeast collection and discharge. The feed stage functions as a means of inputting wort from the initial stages of the brewing process. Each fermentation stage functions in fermentation and $CO_2$ gas bubble collection and discharge. In certain types of brew, this example included, more than one fermentation stage may be needed or desired. Additional fermentation and $CO_2$ collection takes place along the added vertical space provided by each additional stage. An optional isolation stage or section may be added for certain types of brew where the brew requires cooling during ascension. Finally, in the top section, the brew is clarified and output to known filtering, aging, carbonation and/or dispensing sections or apparatus depending upon the particular style of brew processed.

13 Claims, 4 Drawing Sheets

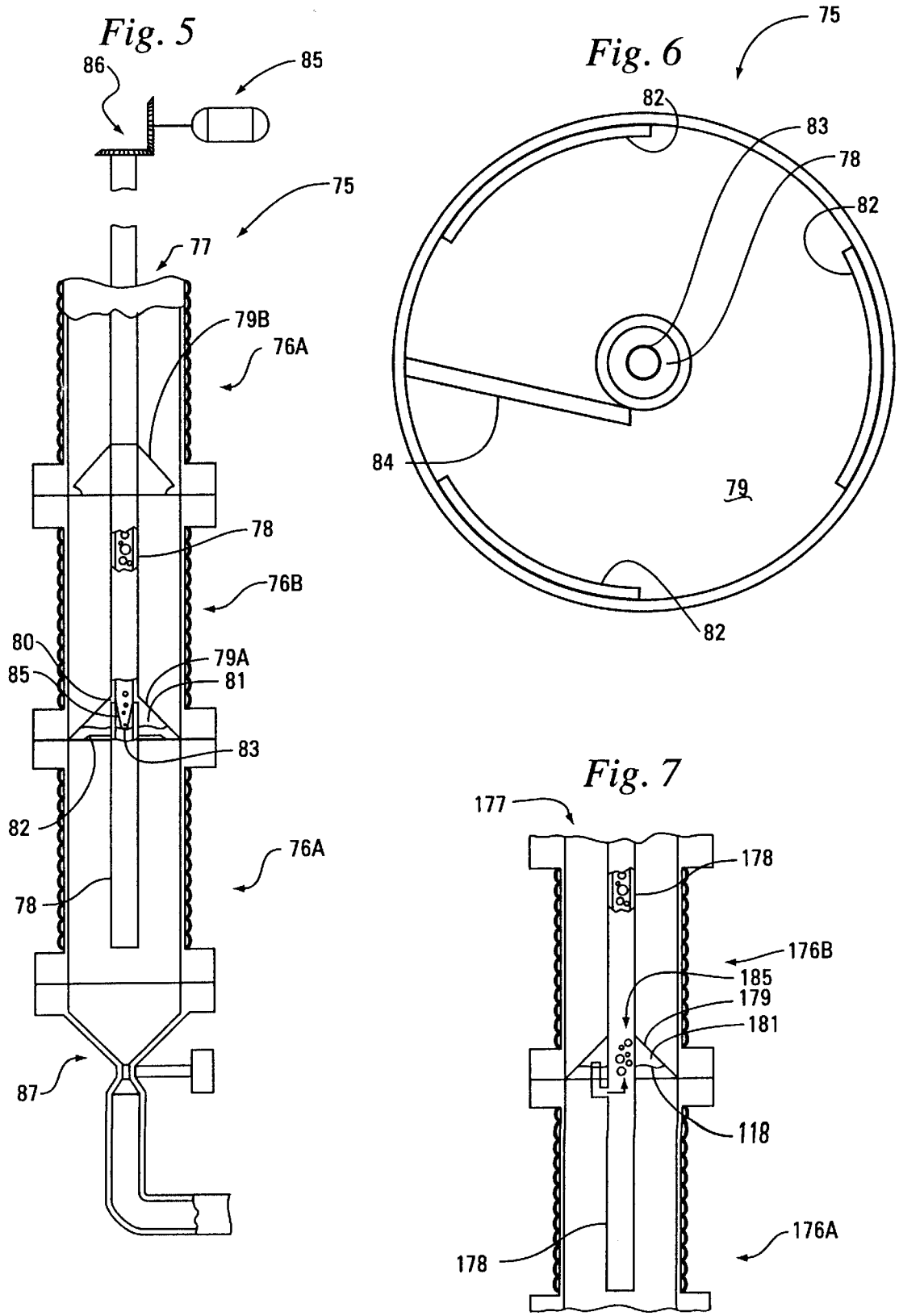

MULTI-STAGE COLUMN CONTINUOUS FERMENTATION SYSTEM

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not Applicable.

BACKGROUND OF THE INVENTION

1. Field of the Invention.

The present invention relates, generally, to fermentation methods and apparatus. More particularly, the invention relates to a continuous fermentation method and apparatus. The invention has particular utility in brewing beer, but may have utility in other uses.

2. Background Information.

Brewing beer is a process that extracts sugars and starches from various grains (typically including barley) and produces a fermented drink. A typical brewing process starts with barely that is malted. In malting the grain is germinated. At that point, sugars and soluble starches are created in the grain which are suitable for brewing beer. The malted barely is then heated in the presence of water to extract sugars and starches from the grains. This process is called mashing. During mashing, some of the starches are converted to fermentable sugars by enzymes. Also during mashing, hops are added for taste and beer preservation. The resultant mixture is given the name "wort". The wort is cooled and fermented by specific types of yeast to produce uncarbonated beer. The uncarbonated beer is sometimes filtered. The final step in the brewing process is the addition of carbonation to produce a finished beer. These steps and ingredients are varied widely to produce different flavors of beer. Thus, the process is referred to the "art of brewing".

Until recent time, brewing beer has been a batch process following traditional methods which are conducted on a large scale and which are inefficient. There has been a small movement towards continuous brewing systems in more recent years. These systems have been mostly cascade reactor systems and systems that use yeast immobilized on beads in a annulus column, which is somewhat similar to a fluidized bed reactor.

In summary, prior art devices and methods are believed to have significant limitations and shortcomings. Applicant's invention provides a method and apparatus which overcome the limitations and shortcomings of the prior art.

BRIEF SUMMARY OF THE INVENTION

The object of this invention is to decrease the size of a brewing system while still utilizing the efficiency of the continuous fermentation system. Another objective is to produce a system that is fairly inexpensive to implement and maintain, and which is relatively easy for a small establishment, such as a brew pub to produce beer for their patrons. The benefits for such an establishment to brew their own beer using a continuous process would come from reduced beer storage and transportation costs. This is especially the case where the establishment is capable of producing in one day what they would need for the next day's consumption.

The present invention provides a new and unique fermentation aspect of a brewing system which is especially well suited for small establishments such as a brew pub. To produce a small brewing system, it is desirable for the fermentation and clarification of the beer to be carried out with one or two pieces of equipment. Applicant recognized that the process would benefit by being disposed vertically to better utilize floor space. One property of beer production that this invention exploits is that the specific gravity of the wort decreases as sugars in the wort are converted to alcohol. In a vertical fermenter, as the fermented wort travels higher, there is a tendency toward stratification because of gravity, which helps keep the fermented wort from traveling back downwardly and mixing with wort fermented to a lesser degree. The apparatus of the invention utilizes the above mentioned parameters in its operation.

A particular aspect of this invention is that it provides a fermenter, comprising:

(a) an elongated, vertically disposed chamber of a predetermined horizontal dimension and a predetermined vertical height;

(b) means to input fluid into the chamber at a predetermined point, (b) at least one $CO_2$ removal assembly disposed at a predetermined point in the chamber above the means to input fluid, the removal member including a collector member oriented to collect $CO_2$ gas in the chamber and a discharge member connected to the collector member; and (c) means to output fluid from the chamber, the means to output fluid being disposed at a predetermined point in the chamber above the $CO_2$ removal assembly.

The features, benefits and objects of this invention will become clear to those skilled in the art by reference to the following description, claims and drawings.

BRIEF DESCRIPTION OF THE SEVERAL VIEWS OF THE DRAWING

FIG. 5 is a front elevational view of an alternative embodiment of the fermenter showing an internal $CO_2$ discharge system.

FIG. 6 is a top view of the $CO_2$ collector in the internal $CO_2$ discharge system shown in FIG. 5.

FIG. 7 is a front view of an alternative embodiment of the gas discharge system.

DETAILED DESCRIPTION

Figure 1:
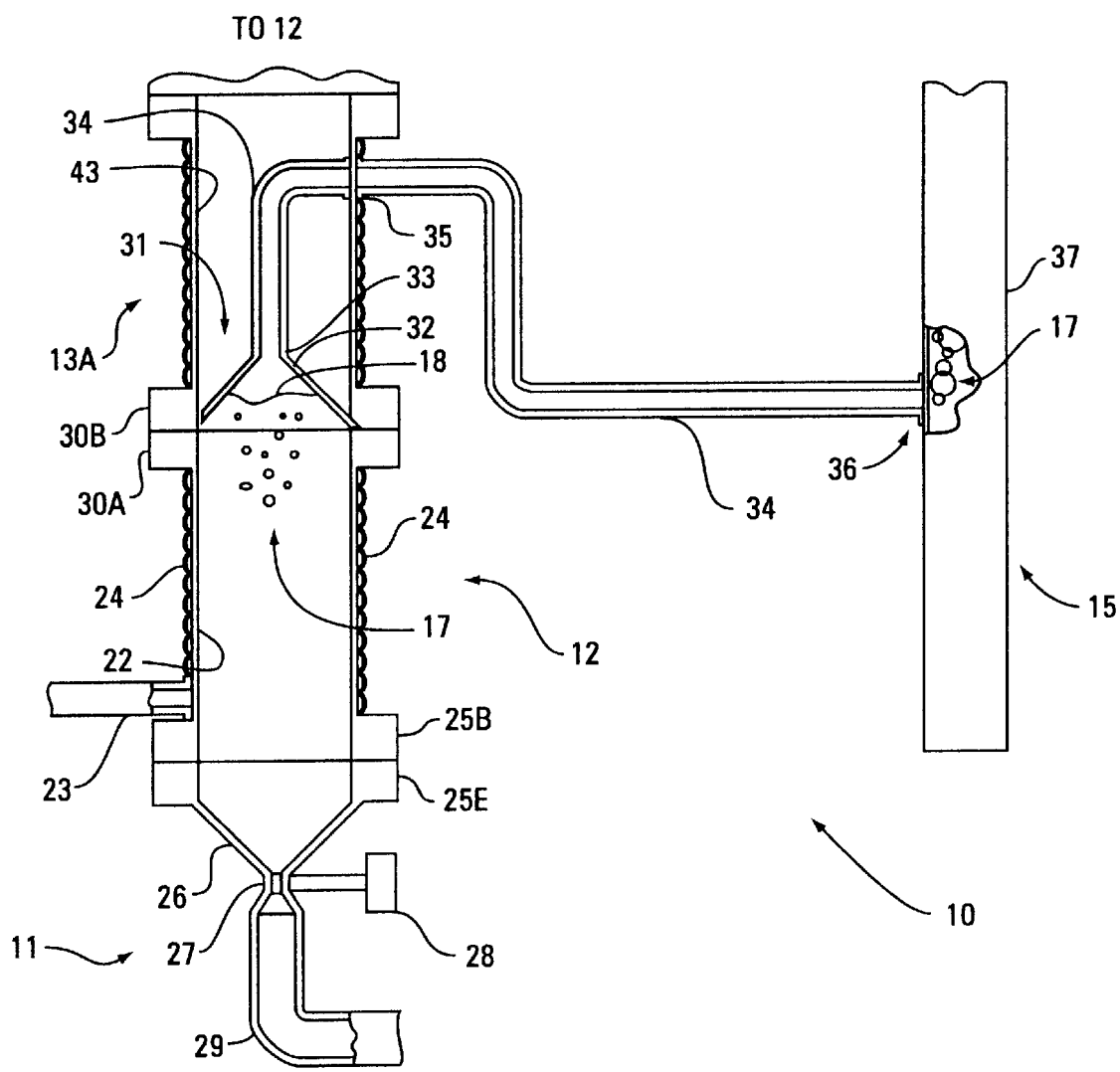
FIG. 1 is a front elevational view of the bottom, feed section of the fermenter of the present invention.
Figure 2:
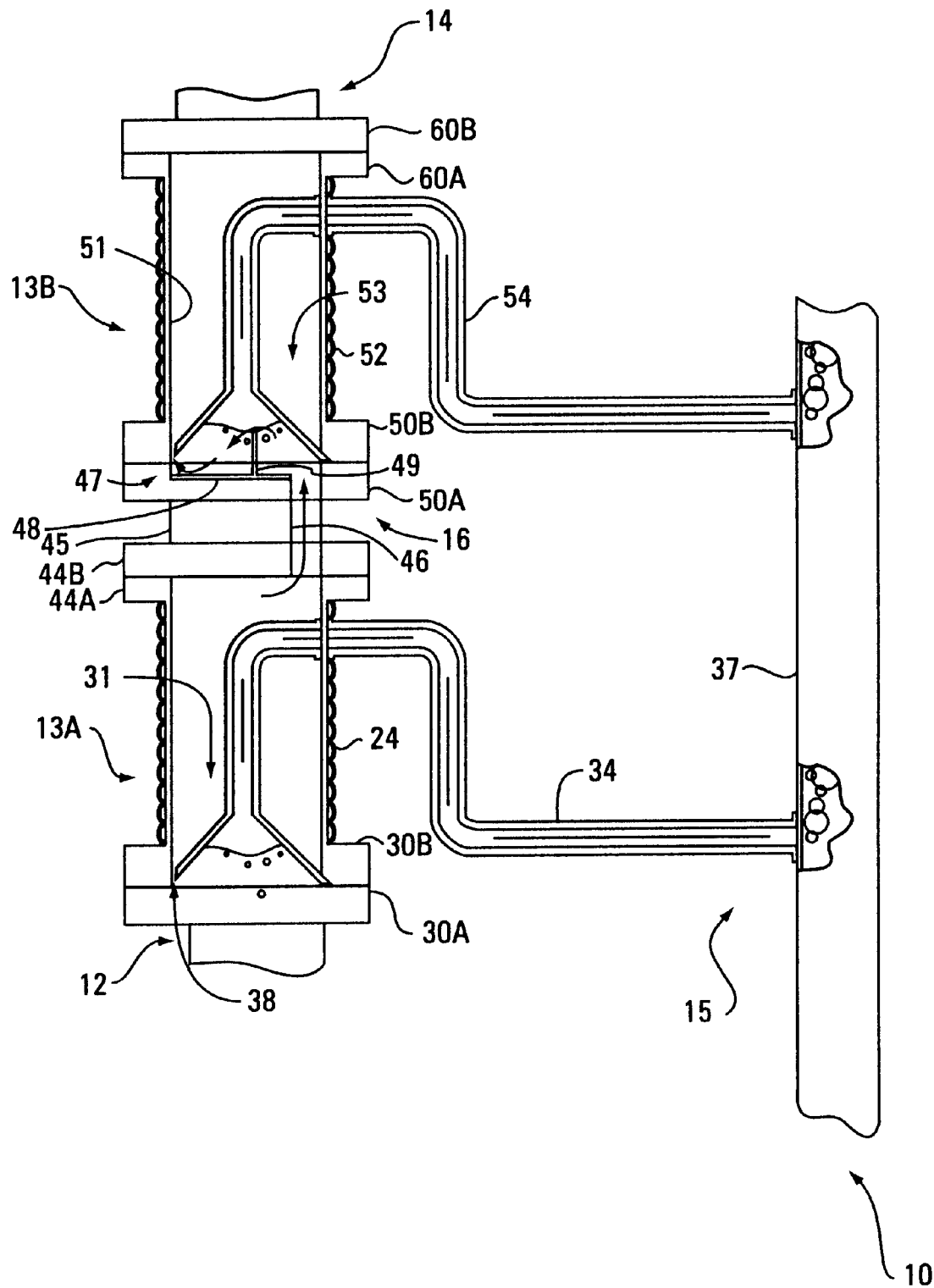
FIG. 2 is a front elevational view of a middle section of the fermenter.
Figure 3:
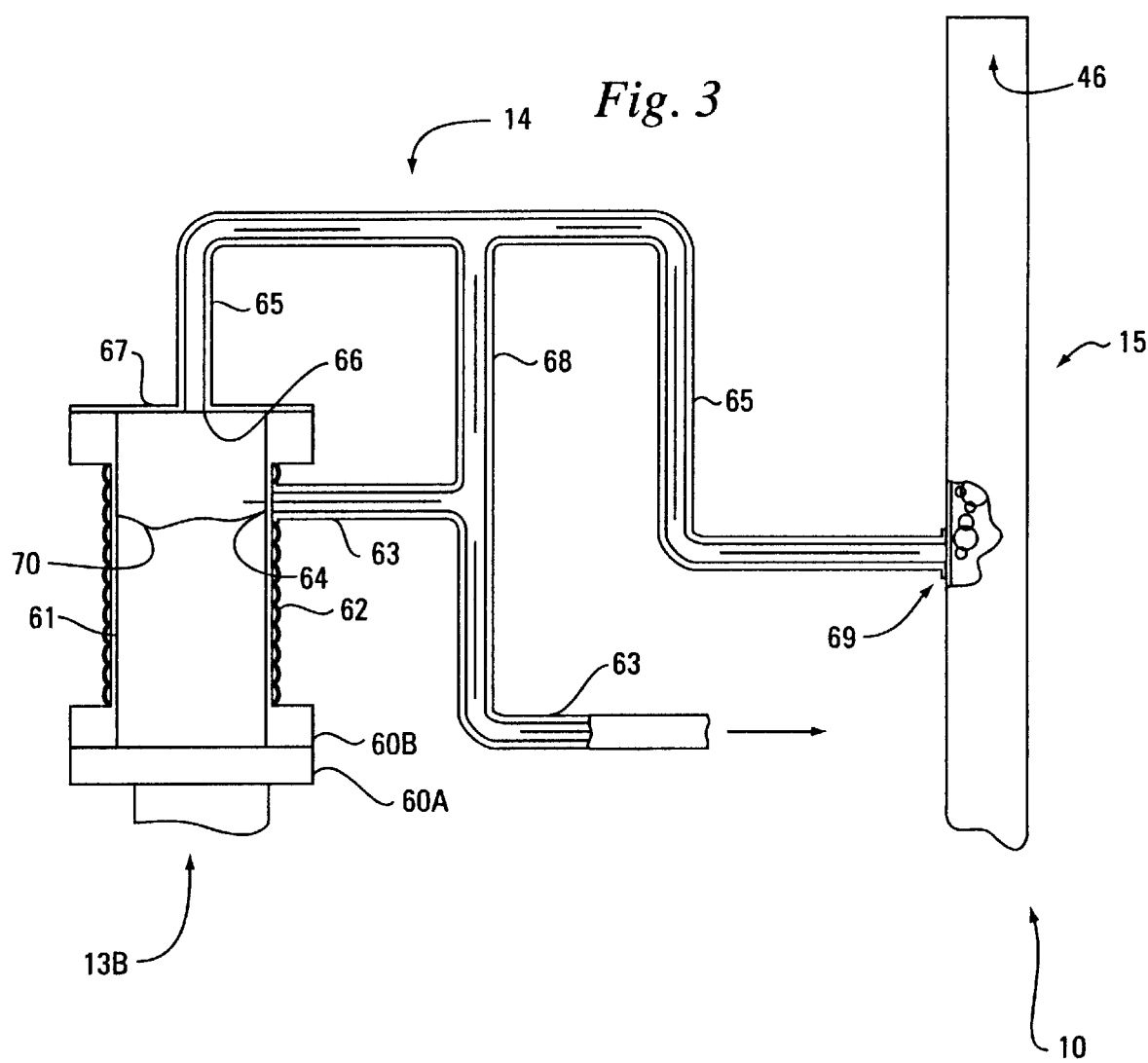
FIG. 3 is front elevational view of the top section of the fermenter.

Referring to FIGS. 1–3, an example of the preferred embodiment of the vertical continuous fermentation apparatus of the present invention is illustrated. A critical problem to overcome in the design of a vertical fermenter is related to the production of carbon dioxide during the fermentation. As carbon dioxide gas bubbles rise in the fermenter due to their buoyancy in the fermenting wort, they create a mixing effect. Mixing is counter productive since varying degrees of fermented wort may be mixed together. For example, wort that is further along in the fermentation process may be mixed with wort that is not so far along, thus decreasing the efficiency of the fermentation process. This problem is solved by the modular design of the apparatus of the present invention, which includes placing carbon dioxide collectors at several intervals, vertically, in the fermenter. The collectors remove gas before it can have a mixing effect and thus improve segregation of the wort. The modular design of the apparatus also provides ease of assembly and disassembly. The number and height of the modular stages that make up the fermenter are dependent on the style of beer, production quantity, and velocity of the wort required in and by the fermenter.

1. SYSTEM STRUCTURE

Referring to FIGS. 1–3, one embodiment of the fermenter 10 comprises several basic interconnected stages or sections. These components include a discharge stage or section 11, a feed stage 12, at least one fermentation stage 13 a top stage 14 and a $CO_2$ discharge column 15. The discharge section 11 functions in waste and yeast collection and discharge. The feed stage 12 functions as a means of inputting liquid wort 18 from the initial stages of the brewing process as described above. Each fermentation stage 13 functions in fermentation and $CO_2$ gas bubble 16 collection and discharge. In certain types of brew, this example included, more than one fermentation stage 13a may be needed or desired. Additional fermentation and $CO_2$ collection takes place along the added vertical space provided by each additional stage 13b. Referring particularly to FIG. 2, an optional isolation stage or section 16 may be added for certain types of brew where the brew requires cooling during ascension. Finally, in the top section 14, the brew is clarified and output to known filtering, aging, carbonation and/or dispensing sections or apparatus (not shown) depending upon the particular style of brew processed.

Referring to FIG. 1, the feed stage 12 includes a cylindrical wall member which is vertically disposed and has a predetermined height and diameter. A horizontally oriented wort inlet 23 is disposed near the bottom of the stage 12. Heating/cooling coils 24 are preferably disposed about the exterior wall of the stage 12 for temperature control.

The discharge stage 11 is connected to the bottom end of the feed stage 12 via connection flanges 25a and b associated with each stage 11 and 12. The discharge stage 11 also has a cylindrical configuration with a conical shaped bottom end 26 which tapers to an outlet 27 which is preferably controlled by a control valve 28. A waste outlet conduit 29 is connected to the outlet 27 and is communicatively connected to a waste collection system (not shown).

The fermentation stage 13a is connected to the top end of the feed stage 12 also via connection flanges 30a and b disposed on each stage 12 and 13. The fermentation stage 13a also has a cylindrical wall 43 of a predetermined diameter and length. It is jacketed by the heating and cooling coils 39, preferably independent of coils 24.

Figure 4:
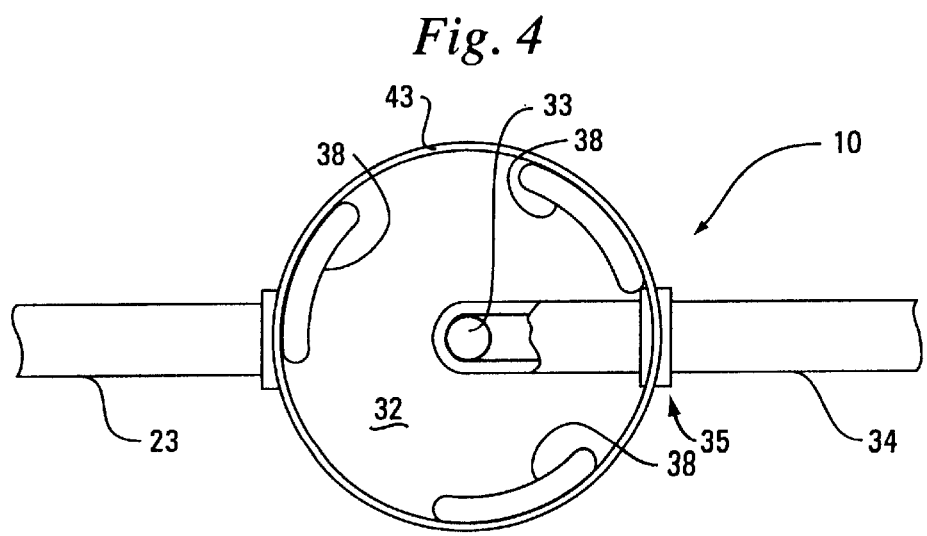
FIG. 4 is a top view of the carbon dioxide ($CO_2$) collector.

Referring also to FIG. 4, a $CO_2$ collector 31 is disposed in the fermentation stage 13a. The $CO_2$ collector 31 comprises a conical hood 32 which extends inwardly from the wall 43 and tapers to an outlet 33 which is connected to a conduit 34. The conduit 34 exits the stage 13a at aperture 35 and is communicatively connected to the $CO_2$ discharge column 15 via aperture 36 therein. The hood 32 has at least one, and preferably three wort pass through apertures 38 of a predetermined, slot-like dimension, disposed at the bottom periphery of the hood 32 and spaced a predetermined distance from each other and in a predetermined pattern.

The $CO_2$ discharge column 15 is an elongated cylindrical tube 37 which is has a predetermined length and diameter. The column 15 is disposed vertically. The column 15 is filled with a liquid, preferably chlorinated water, to create an air lock. A vent 46 is disposed in the top of the column 37 to release $CO_2$ gas to the atmosphere.

Referring to FIG. 2, the isolation stage 16 is connected to the top of the first fermentation stage 13a via flanges 44a and b. The isolation stage 16 further comprises a cylindrical outer wall 45 an interior, vertical pass through conduit 46 of a predetermined diameter communicatively connected to the fermentation stage 13a, and a fluid flow control structure 47, including a horizontal floor member 48 and a vertical dam member 49 of a predetermined height, connected to the top of the conduit 46. The dam 49 prevents higher density (specific gravity) cooler fluid from fermentation stage 13b from flowing back into the lower density warmer fluid from fermentation stage 13a.

Second fermentation stage 13b is connected to the top of the isolation stage 16 via flanges 50a and b. The second fermentation stage 13b has a similar structure and function to that of fermentation stage 13a, including an outer wall 51, a heating/cooling coils 52, $CO_2$ collector 53, and a gas discharge conduit 54.

Referring to FIG. 3, the top section 14 is connected to the top of the second fermentation stage 13b by means of flanges 60a and b. The top section 14 includes a cylindrical member 61, heating/cooling coils 62, and a top cover 67. A brew 70 discharge conduit 63 is connected to an aperture 64 disposed at a predetermined point on the side of the wall 61. A $CO_2$ gas discharge conduit 65 is connected to an aperture 66 in the top cover 67. A connection conduit 68 connects conduits 63 and 65 at a predetermined point. Gas discharge conduit 65 is connected to the $CO_2$ discharge column 15 via aperture 69 therein.

Referring to FIGS. 5 and 6, an alternative embodiment of the system 75 of the present invention is shown for large scale brewing. The system 75 comprises a plurality of stages 76a–i, each of which is similar in design to the stages of the system 10 of the prior embodiment. The principle structural difference in this system 75 is an internal $CO_2$ gas discharge system 77 basically comprising tube 78 and one or more conical collectors 79a and b with liquid wort pass throughs 82. The tube 78 has $CO_2$ pass through apertures 80 disposed near the top of the collector 79 in a gas trap area 81. Back pressure for the carbon dioxide is provided by an inverted conical chute 85 with a bottom aperture 83 disposed in the tube 78. The carbon dioxide fills the gas trap area 81 until it starts to flow around the chute 85 and through the center hole 83 disposed in the tube 78. The carbon dioxide is directed upwardly and out of the system through the column 78 interior.

Referring also to FIG. 6, on the top side of each gas collector, there is a yeast wiper 84. The gas discharge tube is rotated, by means of motor 85 and gear system 86, periodically to wipe any yeast buildup on top of the carbon dioxide collectors 79 and to direct it through the wort pass throughs slots 82 to fall unto the collector below. In the case of the lowest carbon dioxide collector it drops to the drain section 87. The yeast can then be flushed out of the fermenter by opening the bottom discharge valve for a short period of time. Any inactive yeast is then removed before it begins to breakdown and effect the flavoring of the beer.

2. SYSTEM FUNCTION

The discussion of the functioning of the fermenter is confined to its steady state operation. Startup and shutdown operations will become obvious to those skilled in the art upon review of this specification.

Referring to FIGS. 1–4, sterile wort is input to the bottom of the fermenter 10. Attached to the bottom of the feed section 12 is a drain section 11 for draining the system 10 or removing excess yeast that may build up. The diameter of the fermenter 10 is sized to the maximum production rate with keeping the vertical velocity of the wort slow enough so as not to flush the yeast from the column or to create turbulence. The height of the first fermentation stage or section 13a is sized so as to yield a residence time suitable to ensure an appropriate level of carbon dioxide production. At the top of each fermentation section or stage 13 the carbon dioxide is collected and carried away by a carbon dioxide collector 31. for example. The wort is allowed to flow through the carbon dioxide collector 31 at the outer edge through the wort pass throughs 38. Suitable back pressure in the carbon dioxide collector 31 is present to maintain the gas-liquid interface inside the collector 31 above the wort pass throughs. The slots 38 are staggered from one section or stage to the next so that no gas passing through a slot 38 of one stage can directly pass through a slot in the next stage. In this particular configuration, the back pressure and air lock in the carbon dioxide collector 31 are created using a separate column 37 of treated water. When the carbon dioxide is collected it is then carried out the fermenter and to a carbon dioxide discharge column 37. The back pressure is then controlled by the size of the entry point 36 into the carbon dioxide discharge column 37. The back pressure may alternatively be controlled using a small mechanical relief valve. Each section or stage is preferably fitted with a cooling/heating jacket 24, for example, to control the temperature of the fermentation in that stage. This is needed in some specialty beers or fast fermenting beers. An important note is that if the desired fermentation process must decrease the fermenting wort's temperature up the column there must be an isolation connection 16 made in the fermenter. This is needed because as the wort is cooled, it's specific gravity increases and thus it tends to travel back down into the column. Such an isolation connection is only needed when warmer fermenting wort is traveling into a cooler section.

The frequency of the carbon dioxide collectors is decreased approaching the top of the fermenter due to of the lower quantities of carbon dioxide produced. The top section 14 of the fermenter is a clarifying section. When the beer reaches the top of the fermenter, it exits the fermenter it is then passed through a filter and/or an aging column if desired. From this point the beer would be carbonated and placed into a dispensing tank.

Ideally, in a food/drink establishment such as a brew pub, there would be only three dispensing tanks needed. One for dispensing, one for filling, and one being cleaned.

Referring to FIGS. 5 and 6, a modified version of the system 75 is preferably used for certain productions where yeast generations are large. The carbon dioxide discharge system 77 is disposed interiorly. Back pressure for the carbon dioxide is provided by an inverted conical chute 85 with an open center 83 located inside the carbon dioxide discharge tube 78. The carbon dioxide will fill the gas trap area 81 until it starts to flow around through the center hole 83. The carbon dioxide is directed out of the system through the center column 78. As is shown in FIG. 6, on the top side of each gas collector, there is a yeast wiper. The gas discharge tube is rotated periodically to wipe any yeast buildup on top of the carbon dioxide collectors and to direct it through the wort pass throughs slots to fall unto the collector below. In the case of the lowest carbon dioxide collector it drops to the drain section of the fermenter. The yeast can then be flushed out of the fermenter by opening the bottom discharge valve for a short period of time. Any inactive yeast is then removed before it begins to breakdown and effect the flavoring of the beer. To improve the overall system efficiency, the carbon dioxide from the system can be used to re-carbonate the final beer.

FIG. 7 shows a modified version the carbon dioxide discharge system 177 used with a system comprising sections 176a and 176b. Back pressure for the carbon dioxide is provided by an inverted conical chute 185 sealingly disposed about carbon dioxide discharge tube 178. The carbon dioxide will fill gas trap area 181 above wort 118 until it starts to flow down through a 90 degree tube 182 which is communicatively connected to discharge tube 178. The carbon dioxide is directed out of the system through discharge tube 178.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A fermenter, comprising:

(a) an elongated, vertically disposed chamber of a predetermined horizontal dimension and a predetermined vertical height, said chamber being constructed in a plurality of substitutable stages each vertically connectable and disconnectable to each other;

(b) means to input fluid into said chamber at a predetermined point, (c) at least one $CO_2$ removal assembly disposed at a predetermined point in said chamber above said means to input fluid, said removal member including a collector member oriented to collect $CO_2$ gas in said chamber and a discharge member connected to said collector member; and (d) means to output fluid from said chamber, said means to output fluid being disposed at a predetermined point in said chamber above said $CO_2$ removal assembly.

2. The fermenter of claim 1, wherein each said stage includes a cylindrical outer wall.

3. The fermenter of claim 2, further comprising a feed stage, said feed stage including said means to input fluid.

4. The fermenter of claim 2, further comprising a waste discharge stage, said waste discharge stage being disposed at a point in said chamber below said means to input fluid.

5. The fermenter of claim 2, further comprising at least one fermentation stage, said fermentation stage having a predetermined vertical height and being disposed above said means to input fluid, said fermentation stage including one said $CO_2$ removal assembly.

6. The fermenter of claim 2, further comprising at least one isolation stage, said isolation stage including means to prevent a higher density fluid from flowing into a lower density fluid.

7. The fermenter of claim 2, further comprising a top stage, said top stage including said means to output fluid.

8. The fermenter of claim 2, further comprising means to control the temperature of a single said stage.

9. A fermenter, comprising:

(a) an elongated, vertically disposed chamber of a predetermined horizontal dimension and a predetermined vertical height;

(b) means to input fluid into said chamber at a predetermined point, (c) at least one $CO_2$ removal assembly disposed at a predetermined point in said chamber above said means to input fluid, said removal member including a collector member oriented to collect $CO_2$ gas in said chamber and a discharge member connected to said collector member, said $CO_2$ removal assembly collector member being a conical structure having a lower maximum peripheral horizontal dimension substantially equivalent to said chamber horizontal dimension, said collector further having at least one fluid flow through aperture and a gas $CO_2$ gas flow through aperture, said discharge member being a conduit connected to said $CO_2$ gas flow through aperture and exiting said chamber; and (d) means to output fluid from said chamber, said means to output fluid being disposed at a predetermined point in said chamber above said $CO_2$ removal assembly.

10. The fermenter of claim 9, further having an elongated, fluid filled $CO_2$ discharge column disposed outside said chamber, said discharge member conduit being connected thereto.

11. The fermenter of claim 9, wherein there are a plurality of fermentation stages, and wherein said each fermentation stage $CO_2$ removal assembly collector member is configured so that its said at least one fluid flow through aperture is vertically non-aligned with the fluid flow through aperture of a higher adjacent fermentation stage.

12. A fermenter, comprising:

(a) an elongated, vertically disposed chamber of a predetermined horizontal dimension and a predetermined vertical height;

(b) means to input fluid into said chamber at a predetermined point, (c) at least one $CO_2$ removal assembly disposed at a predetermined point in said chamber above said means to input fluid, said removal member including a collector member oriented to collect $CO_2$ gas in said chamber and a discharge member connected to said collector member, said $CO_2$ removal assembly collector member being a conical structure having a lower maximum peripheral horizontal dimension substantially equivalent to said chamber horizontal dimension, said collector further having at least one fluid flow through aperture and a gas $CO_2$ gas flow through aperture, said discharge member being a conduit connected to said $CO_2$ gas flow through aperture and interiorly disposed in said chamber; and (d) means to output fluid from said chamber, said means to output fluid being disposed at a predetermined point in said chamber above said $CO_2$ removal assembly.

13. A multi-stage column continuous malt beverage fermentation system, comprising:

(a) an elongated, vertically disposed chamber of a predetermined horizontal dimension defined by an outer wall and a predetermined vertical height; said chamber comprising:

(i) a waste discharge stage, (ii) a feed stage communicatively connected to a top of said waste discharge stage and including means to control the temperature of fluid in said feed stage, (iii) at least one fermentation stage communicatively connected to a top of said feed stage and including means to control the temperature of fluid in said fermentation stage, said fermentation stage further comprising a $CO_2$ removal assembly disposed substantially at a top of said stage, said removal member including a collector member oriented to collect $CO_2$ gas in said stage and a discharge member connected to said collector member, and wherein said collector member is a conical structure having a lower maximum peripheral horizontal dimension substantially equivalent to said chamber horizontal dimension, said collector further having at least one fluid flow through aperture and a gas $CO_2$ gas flow through aperture, and wherein said discharge member is a conduit connected to said $CO_2$ gas flow through aperture, and (iv) a top stage communicatively connected to said top of said at least one fermentation stage, said top stage including means to control the temperature of fluid in said top stage and means to vent $CO_2$ gas therefrom;

(b) means to input wort and yeast fluid mixture into said feed stage; and (c) means to output brewed fluid from said top stage.

* * * * *